United States Patent
McHenry et al.

(10) Patent No.: US 7,769,486 B2
(45) Date of Patent: Aug. 3, 2010

(54) REMOTE INTERFACE FOR A MOBILE STORAGE SYSTEM OR OTHER EQUIPMENT

(75) Inventors: William B. McHenry, Fort Atkinson, WI (US); William W. R. Lynt, III, Fort Atkinson, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 345 days.

(21) Appl. No.: 10/516,279

(22) PCT Filed: Jun. 13, 2003

(86) PCT No.: PCT/US03/18549
§ 371 (c)(1),
(2), (4) Date: Nov. 29, 2004

(87) PCT Pub. No.: WO03/107243
PCT Pub. Date: Dec. 24, 2003

(65) Prior Publication Data
US 2006/0075322 A1    Apr. 6, 2006

Related U.S. Application Data

(60) Provisional application No. 60/388,834, filed on Jun. 14, 2002.

(51) Int. Cl.
*G06F 7/00* (2006.01)
(52) U.S. Cl. ............... 700/241; 700/217; 700/232; 700/244; 700/214
(58) Field of Classification Search ......... 700/231–244; 312/201, 202; 211/122
See application file for complete search history.

(56) References Cited

U.S. PATENT DOCUMENTS

| | | | | | |
|---|---|---|---|---|---|
| 3,957,323 | A | * | 5/1976  | Tucker et al. | 312/198 |
| 4,033,649 | A | * | 7/1977  | Naito et al. | 312/201 |
| 4,039,040 | A | * | 8/1977  | Spears et al. | 104/288 |
| 4,256,355 | A | * | 3/1981  | Yamaguchi et al. | 312/198 |
| 4,307,922 | A | * | 12/1981 | Rhodes, Jr. | 312/198 |
| 4,412,772 | A | * | 11/1983 | Naito et al. | 312/199 |
| 4,437,711 | A | * | 3/1984  | Dahnert | 312/201 |
| 4,441,617 | A | * | 4/1984  | Forsberg | 211/1.57 |
| 4,467,924 | A | * | 8/1984  | Morcheles | 211/1.57 |
| 4,693,418 | A | * | 9/1987  | Peterman | 238/10 R |
| 4,733,923 | A | * | 3/1988  | Dahnert | 312/201 |
| 4,783,618 | A | * | 11/1988 | Artrip | 318/587 |
| 5,065,872 | A | * | 11/1991 | Simon | 211/122 |

(Continued)

*Primary Examiner*—Gene Crawford
*Assistant Examiner*—Michael K Collins
(74) *Attorney, Agent, or Firm*—Andrus, Sceales, Starke & Sawall, LLP

(57) ABSTRACT

A communication system for providing the ability to control, monitor or diagnose equipment such as a mobile storage system having a series of movable storage units. Each storage unit includes a controller or operational interface, and a communication interface is interconnected with the controller. The communication interface preferably provides access to the controller via the Internet, which enables access to the controller from virtually any location without the need for dedicated communication software. The communication system enables an owner to have access to information on the mobile storage system from any location, and also enables local service personnel and a manufacturer's customer service personnel to access information on the system from any location to assist in troubleshooting, servicing and maintenance.

11 Claims, 14 Drawing Sheets

U.S. PATENT DOCUMENTS

| | | | |
|---|---|---|---|
| 5,160,190 A | 11/1992 | Farrell et al. | |
| 5,164,648 A * | 11/1992 | Kita et al. | 318/587 |
| 5,207,335 A * | 5/1993 | Voelz | 211/122 |
| 5,211,523 A * | 5/1993 | Andrada Galan et al. | 414/282 |
| 5,330,062 A * | 7/1994 | Murphree | 211/122 |
| 5,408,089 A * | 4/1995 | Bruno et al. | 250/221 |
| 5,434,490 A * | 7/1995 | Ishida et al. | 318/587 |
| 5,568,030 A * | 10/1996 | Nishikawa et al. | 318/587 |
| 5,636,750 A | 6/1997 | Heyl | |
| 5,670,778 A * | 9/1997 | Smith | 250/221 |
| 5,819,008 A * | 10/1998 | Asama et al. | 700/255 |
| 5,825,981 A * | 10/1998 | Matsuda | 700/248 |
| 5,850,082 A * | 12/1998 | Eaton et al. | 250/221 |
| 5,857,413 A * | 1/1999 | Ward | 104/48 |
| 5,933,354 A * | 8/1999 | Shimada et al. | 700/228 |
| 5,953,234 A * | 9/1999 | Singer et al. | 700/214 |
| 6,049,745 A * | 4/2000 | Douglas et al. | 701/23 |
| 6,125,306 A * | 9/2000 | Shimada et al. | 700/217 |
| 6,526,702 B2 * | 3/2003 | Jones | 52/64 |
| 6,663,273 B2 * | 12/2003 | Robey | 362/559 |
| 6,669,314 B1 * | 12/2003 | Nemec et al. | 312/201 |
| 6,842,665 B2 * | 1/2005 | Karlen | 700/217 |
| 6,895,301 B2 * | 5/2005 | Mountz | 700/215 |
| 6,950,722 B2 * | 9/2005 | Mountz | 700/214 |
| 7,025,191 B2 * | 4/2006 | Lichti et al. | 198/347.1 |
| 7,032,762 B2 * | 4/2006 | Miyazaki et al. | 211/162 |
| 7,044,373 B1 * | 5/2006 | Garber et al. | 235/385 |
| 7,123,988 B2 * | 10/2006 | Russell et al. | 700/217 |
| 2007/0106413 A1 * | 5/2007 | Russell et al. | 700/113 |

* cited by examiner

FIG. 8

DIAGNOSTIC UNIT INFORMATION
62

| HOME | INFO | CONTACTS | LINKS |

| DIAGNOSTIC VERSION | |
| DIAGNOSTIC FUNCTION | ⊙ GATEWAY  ○ INTERFACE |
| CUSTOMER SITE | |
| CUSTOMER LOCATION | |
| CUSTOMER CONTACT | |
| CUSTOMER PHONE | |
| CUSTOMER E-MAIL | |
| AREA CONTRACTOR | |
| AC CONTACT | |
| AC PHONE | |
| AC E-MAIL | |

| HOME | INFO | CONTACTS | LINKS |

66

ADDITIONAL INFORMATION ABOUT SPACESAVER CORPORATION CAN BE FOUND AT OUR WEBSITE:
HTTP://WWW.SPACESAVER.COM

DIAGNOSTIC UPGRADES CAN BE FOUND AT OUR DIAGNOSTIC SUPPORT SITE:
HTTP://WWW.SPACESAVER.COM/DIAGNOSTIC

CUSTOMERS WITH PROPER ACCESS CAN LOGIN TO OUR EXTRANET HERE:
HTTP://WWW.SPACEINFO.CC/

| HOME | INFO | CONTACTS | LINKS |

SYSTEM CONFIGURATION

CURRENT UNIT: [1▼]  UNIT TYPE: [EC-400]  SOFTWARE VERSION: [9.21]  *78*

| AUTO-STOP TIMEOUT | [30] | CARRIAGE SPACING | [25] | AISLE WIDTH | [36] |
| CREEP TIMEOUT | [12] | LAST AISLE SPACING | [6] | OPTION VALUE | [255] |
| AISLE LIGHT TIMEOUT | [20] | FIRE / NIGHT PARK TIMER | [15] | IR OPTION | [0] |
| BAY LIGHT TIMEOUT | [0] | AUTO MOVE TIMER | [15] | MOTOR SKEW | [0] |
| START BEEP TIMEOUT | [3] | | | MOTOR POSITION | [ALONE▼] |
| AISLE RELOCK TIMER | [6] | | | | |

☒ ONE TOUCH         ☒ ACCESS INDICATOR      ☐ SAFETY FAULT WARNING
☐ MANUAL RESET      ☒ LIGHTS INSTANT ON     ☐ BEEPER ON AUTO MOVE
☒ AUTO POWER UP     ☒ LIGHTS TIMED          ☒ BLOCK MOVE
☐ STATIONARY CARRIAGE ☐ MINUTE TIMERS       ☐ ENABLE AUXILIARY INPUT
☒ SHARE RIGHT LIMITS ☐ USE S6 RAMP TABLE    ☐ CONTROL HEAD BEEP
☒ SHARE LEFT LIMITS  ☐ HEAVY CARRIAGE       ☐ 50 Hz POWER
☐ SECURITY LOCK LEFT

☐ FIRE PARK         ☐ NIGHT PARK            ☒ PRIORITY AISLE [1]
  ○ CLOSE             ○ CLOSE                 ☐ ROVING AISLE
  RIGHT               RIGHT                   ☐ VENTILATION PARK
  ○ CLOSE LEFT        ○ CLOSE LEFT            ○ CLOSE RIGHT
  ○ ALT CLOSE         ○ ALT CLOSE             ○ CLOSE LEFT
  ☐ EVEN              ☐ EVEN                  ○ ALT CLOSE
  SPACE               SPACE

| HOME | INFO | CONTACTS | LINKS |

SYSTEM DIAGNOSTICS

CURRENT UNIT: [1▶]  UNIT TYPE: [EC-400]  SOFTWARE VERSION: [9.21]
NUMBER OF UNITS: [6]                      NUMBER OF AISLES: [7]

84

86

| | | MOTION REQUESTS | | LIMIT SWITCH STATUS |
|---|---|---|---|---|
| OPTION INPUT 1 | [OFF] | MOVE LEFT | [OFF] | RIGHT [EXTENDED] |
| OPTION INPUT 2 | [OFF] | RESET | [OFF] | LEFT [EXTENDED] |
| OPTION INPUT 3 | [OFF] | MOVE RIGHT | [OFF] | SAFETY SWEEP STATUS |
| OPTION INPUT 4 | [OFF] | | | RIGHT [NORMAL] |
| OPTION INPUT 5 | [OFF] | | | LEFT [NORMAL] |
| OPTION INPUT 6 | [OFF] | | | |

88

ZFS STATUS

| OKTM DROPPED | [NO] | LEFT LATCHED [NO] | RIGHT LATCHED [NO] |
| MOVE TOO LONG | [NO] | LEFT LEDs [0] | RIGHT LEDs [0] |
| CREEP TOO LONG | [NO] | LEFT QUAD [0] | RIGHT QUAD [0] |
| MOTOR SPEED DIFF. | [NO] | | |
| NO MOTOR COUNTS | [NO] | | |
| LOST SYSTEM COMM. | [NO] | | |

FIG. 14A

INTERFACE SETTINGS

90

CUSTOMER INFORMATION:

| | |
|---|---|
| NAME | SPACESAVER CORPORATION UNIVERSITY |
| CONTACT NAME | BOB JONES |
| CONTACT PHONE | 920-555-1234 |
| CONTACT E-MAIL | BOB@SSCU.COM |

AC INFORMATION:

| | |
|---|---|
| AC NAME | SPACE SAVING SYSTEMS OF WISCONSIN |
| AC CONTACT | JOHN DOE |
| AC PHONE | 262-555-1234 |
| AC E-MAIL | JDOE@SSSW.COM |

MODEM SETTINGS:

| | |
|---|---|
| PHONE NUMBER | 262-555-4321 |
| BAUD | 56000 ▼ |
| PARITY | NONE ▼ |
| DATA BITS | 8 ▼ |
| STOP BITS | 1 ▼ |

[HOME] [INFO] [CONTACTS] [LINKS]

ETHERNET SETTINGS:

| IP ADDRESS | 192.168.1.100 |
| SUBNET MASK | 255.255.255.0 |
| DEFAULT GATEWAY | 192.168.1.1 |

CONTACT SETTINGS:

| CONTACT NAME | E-MAIL / PAGER # | DAYS VALID | START OF DAY | END OF DAY |
|---|---|---|---|---|
|  |  | CHOOSE ONE ▼ | : AM▼ | : AM▼ |

ADD   CLEAR

CONTACT 1: BOB HOUSH    BOB@SPACESAVER.COM    WEEKDAYS, 7:00 AM TO 5:00 PM
CONTACT 2: BOB HOUSH    262-123-4567    EVERYDAY, 12:00 AM TO 12:00 AM

REMOVE

CONDITION REPORTING TREE:

☑ EVENT 1:
IF [CHOOSE A CONDITION ▼] [  ] TIME(S) OR PRESENT FOR [  ] [MINUTES▼], THEN NOTIFY:
CONTACT # [1▼], CONTACT # [1▼], CONTACT # [1▼], CONTACT # [1▼]

FIG. 14B

REMOTE INTERFACE FOR A MOBILE STORAGE SYSTEM OR OTHER EQUIPMENT

CROSS-REFERENCE TO RELATED APPLICATION

This application claims the benefit of U.S. Provisional Application Ser. No. 60/388,834, filed Jun. 14, 2002.

BACKGROUND AND SUMMARY OF THE INVENTION

This invention relates to a system for interfacing with equipment from a remote location, and more particularly to a system for interfacing with equipment such as a mobile file or storage system for use in configuring, diagnosing, changing settings or ascertaining status of the system.

A mobile storage system typically includes a series of carriages that are movably supported on floor-mounted rails. Storage units are mounted to the carriages, and may be in the form of shelving units, file cabinets or the like. Movement of the carriages on the rails functions to selectively create an open area or aisle adjacent the storage unit, to provide access to items contained or stored in the storage unit.

Mobile storage systems include a number of parts and components that require periodic service or replacement, or which can malfunction or break down so as to require servicing. In addition, certain types of mobile storage systems may have variable operating parameters that can be changed or adjusted, e.g. to address varying user requirements or according to the types of materials contained or stored in the storage units. In the past, periodic routine maintenance has been performed on mobile storage systems of this type by a local contractor based on passage of time, e.g. quarterly, semiannually, etc., regardless of the amount of usage of the system. In addition, in the event of a malfunction or breakdown, it has been necessary for service personnel to be dispatched to the site without knowing the nature of the problem. This requires the service personnel to load the service vehicle with the majority of parts that could be the cause of the problem in order to save time, or to know that a return trip to a parts storage facility may be required in order to retrieve the parts necessary to repair the system after diagnosing the cause of the malfunction or breakdown on site. In addition, prior art communication with the manufacturer of the system has been primarily through the local service personnel without the manufacturer's customer service personnel. Further, in order to change settings or operating parameters of the system, it has been necessary for service personnel to make a service call in order to adjust the parameters or settings on the control system of the carriage.

It is an object of the present invention to provide a system for remotely monitoring, diagnosing or controlling operation of a mobile storage system. It is a further object of the invention to provide such a remote system that can be utilized by the owner of the system as well as by a local service entity and the manufacturer of the system. Yet another object of the present invention is to provide such a system for efficiently scheduling routine maintenance service calls. Yet another object of the invention is to provide such a system for enabling remote diagnostic capability, so as to provide efficient repair capability in the event of a malfunction or breakdown. Yet another object of the invention is to provide such a system which enables upgrades, alterations or modifications to the operating software of the mobile storage system. A still further object of the invention is to provide such a system which is capable of initiating contact with the system owner or local service personnel in the event the system requires routine maintenance or experiences a malfunction or breakdown.

In accordance with the present invention, a mobile storage system includes a series of movable storage units, each of which includes a controller or operational interface, and a communication system interconnected with each controller for providing access to the controller from a remote location, in order to control, diagnose and/or monitor operation of the system. In a particularly preferred embodiment, the communication system operates via a global computer network, i.e. the Internet, which provides ease of use and access from virtually any location, without any special software requirements for the owner of the system. The communication system and the controller are arranged to provide information as to various parameters of operation of the system from a remote location, so as to allow service personnel to monitor or control operation of the system, or to provide diagnostic tools for the system in the event of a malfunction or breakdown. The communication system is capable of initiating communication with appropriate individuals or organizations, e.g. by use of a decision tree, in the event one or more operating parameters are determined to be out of conformance with predetermined settings.

The invention contemplates a mobile storage system as summarized above, as well as an improvement in a mobile storage system and a method of interfacing with a mobile storage system, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

Figure 9:
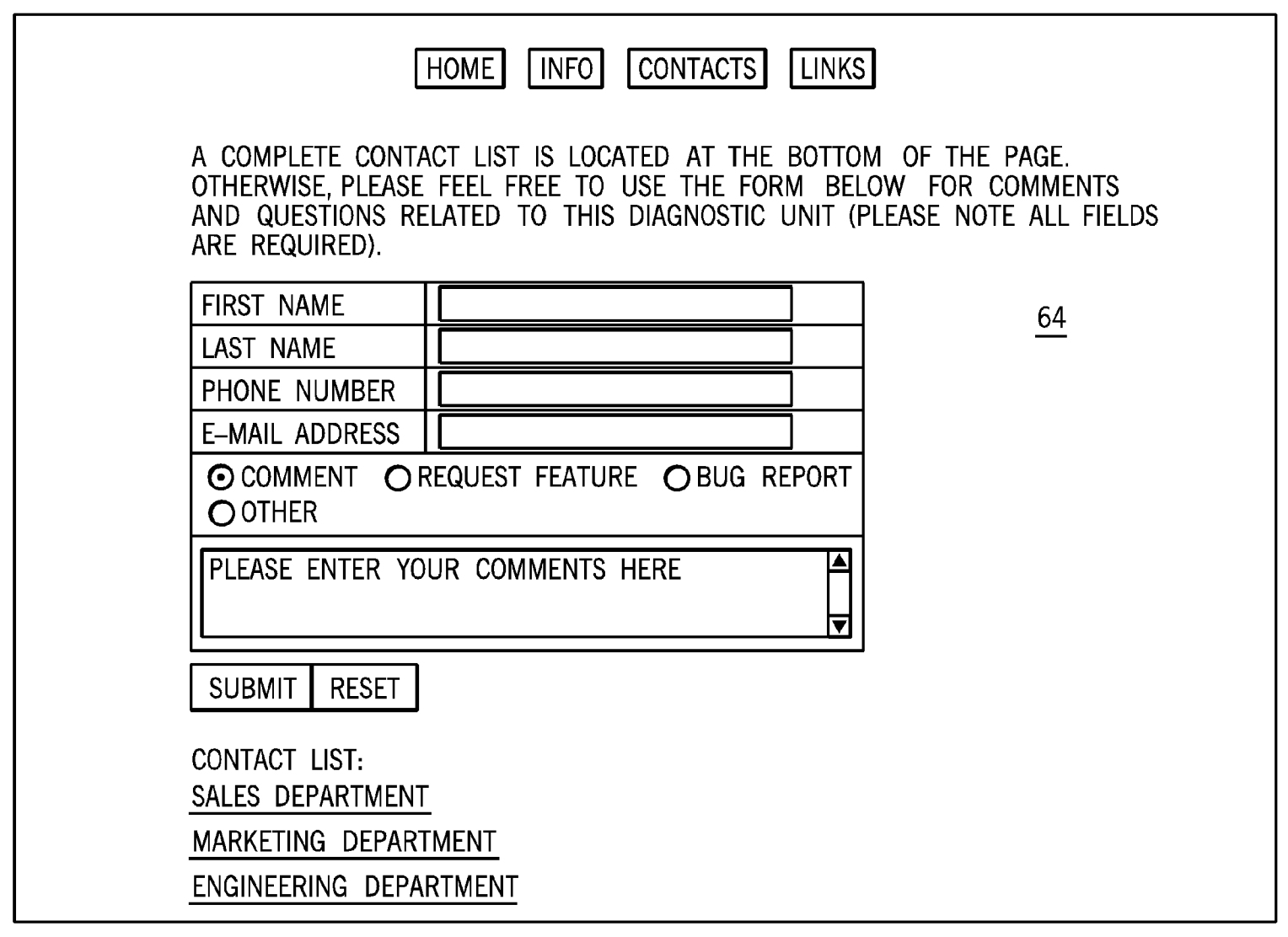

FIGS. 7-14b are views illustrating representative user interface screens employed in the communication system of the present invention.

DETAILED DESCRIPTION OF THE INVENTION

Figure 1:
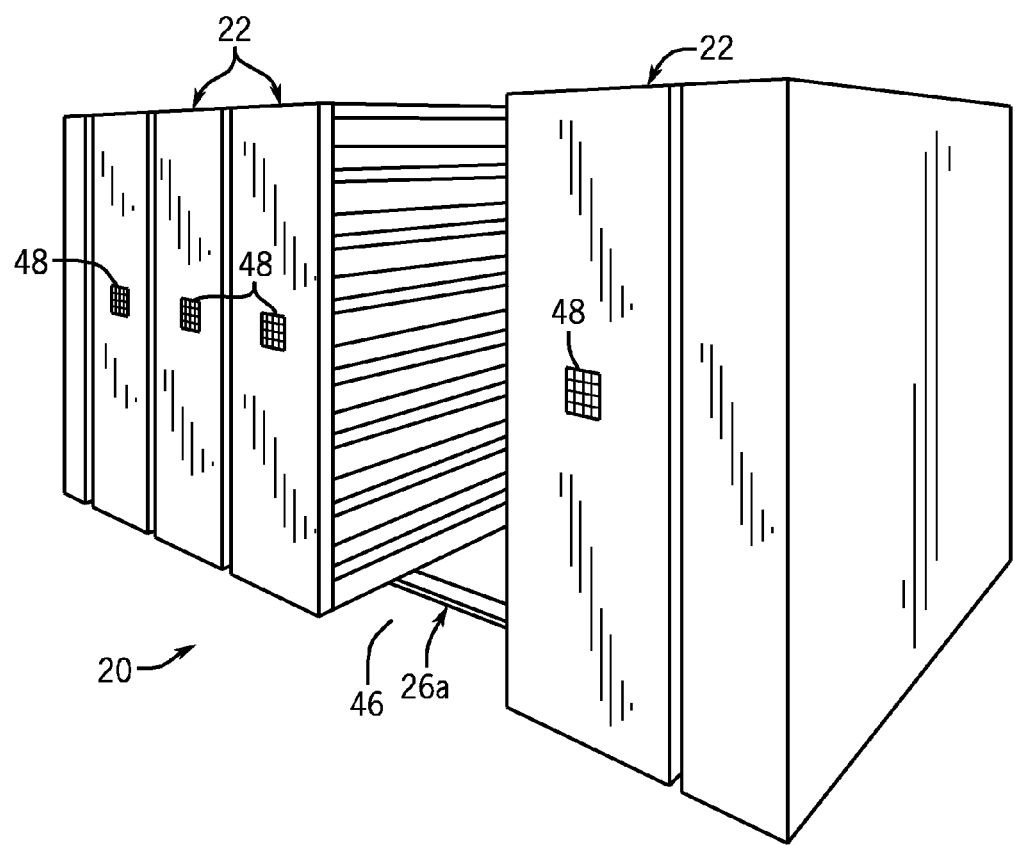
FIG. 1 is an isometric view of a mobile storage system incorporating the communication system of the present invention.
Figure 2:
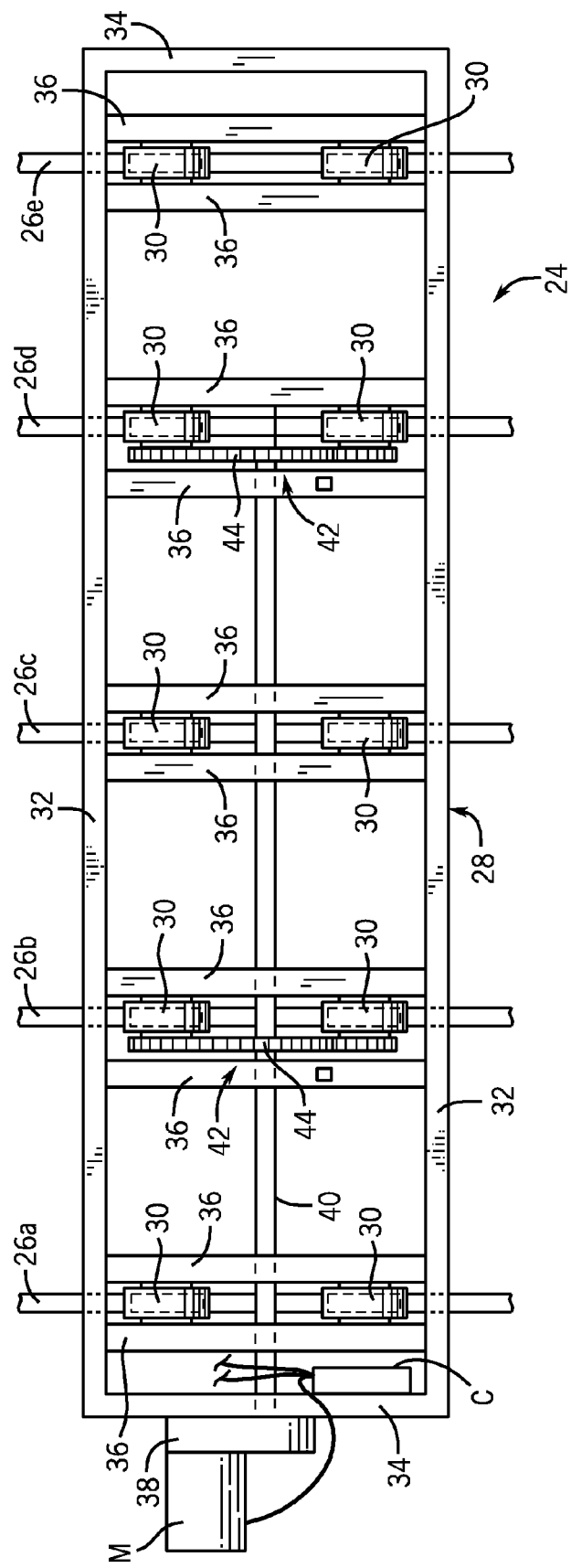
FIG. 2 is a top plan view of one of the carriages for a mobile storage unit incorporated in the mobile storage system of FIG. 1.

Referring to FIG. 1, a mobile storage installation in a location such as an office, library, archive, etc. is generally made up of one or more mobile storage systems 20. In a manner as is known, each mobile storage system 20 includes a series of storage units 22, and each mobile storage unit 22 includes a motorized, movable carriage 24 (FIG. 2) which is typically supported on a floor by means of a series of parallel rails, such as shown at 26a, 26b, 26c, 26d and 26e. In a manner as is known, each storage unit 22 typically consists of a number of individual storage cabinets or shelving units mounted to carriage 24 in a side-by-side manner, which are adapted to receive books, files, tape reels, or the like.

In a representative construction, each mobile storage unit carriage 24 includes a frame 28 that is supported on rails 26a-26e via a pair of wheels 30 that rest on each of rails 26a-26e. Frame 28 includes longitudinal frame members 32 and end frame members 34, and each set of wheels 30 is supported by intermediate support members 36 that extend between longitudinal frame members 32, in a manner as is known. In order to move carriage 24 along rails 26a-26e, a motor M is mounted to frame 28, such as to one of end frame members 34. Motor M is interconnected with an output gearbox 38, and a drive shaft 40 is connected to and extends from gearbox 38. Drive shaft 40 is drivingly engaged with a pair of drive units 42 which are preferably arranged symmetrically relative to the center of carriage 24 in order to reduce skewing, in a known manner. Each drive unit 42 includes a drive chain 44 that is engaged with a pair of sprockets secured to one of the sets of wheels 30, so as to drive the wheels 30 in response to operation of motor M. A representative construction of carriage 24 is shown and described in Muth U.S. Pat. No. 6,161,485, the disclosure of which is hereby incorporated by reference. It is understood, however, that the construction of carriage 24 may vary from that shown and described.

Carriages 24 are operated in a known manner to selectively create a space or aisle 46 between adjacent storage units 22, in response to operation of an operator or user interface 48, to provide access to the contents of the storage units 22. A mobile storage system of this general type is available from Spacesaver Corporation of Fort Atkinson, Wis., and is typically known as a programmable electric type system or POWER PRO™ system.

Figure 3:
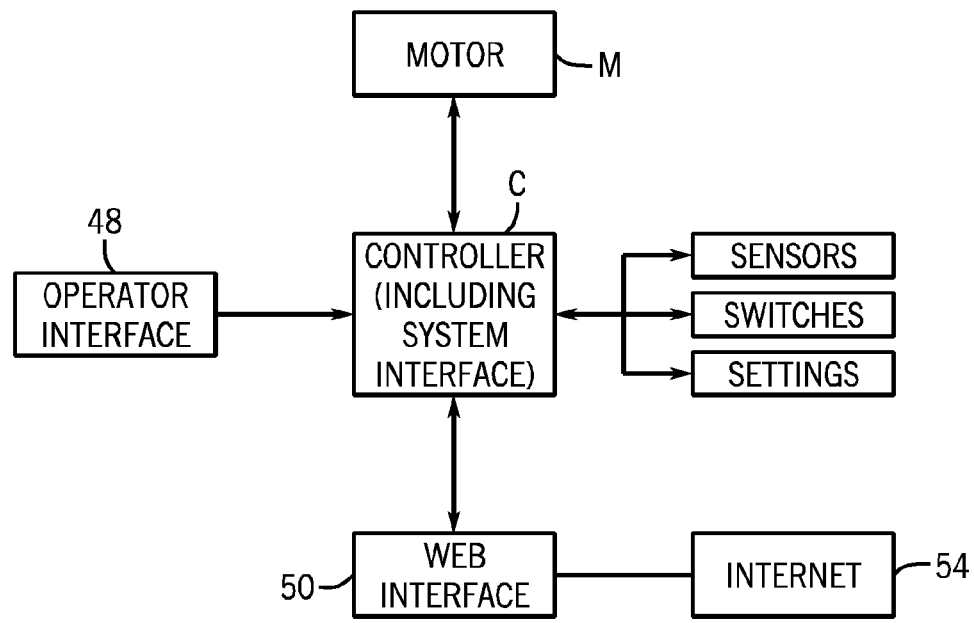
FIG. 3 is a block diagram illustrating the components incorporated in one of the mobile storage units of FIG. 1 and the communication system incorporated therein.

In a mobile storage installation of this type, each storage module 22 includes a controller C (FIG. 3) that is responsive to operator or system inputs from operator input 48 for controlling operation of the storage units 22 incorporated in each storage system 20. The controller C is interconnected with the various components of its associated storage module 22, such as the motor M, limit and other switches, safety system sensors, etc., for controlling operation of such components according to predetermined operating settings or parameters. Controller C is interconnected with motor M for controlling its operation, and includes a system interface that receives inputs from operator interface 48 as well as from the various sensors and switches of the storage unit, to enable controller C to contain information on all aspects of the various components of the storage unit 22. Controller C may also be manipulated to set and adjust the various settings and other operating parameters of storage unit 22. In a representative construction, controller C may be mounted to frame 28 of carriage 24 as shown in FIG. 3, although it is understood that controller C may also be contained within a space defined by the end panel of the storage unit 22 or in any other satisfactory location. Appropriate wiring extends from controller C for connection to motor M and to the other components of carriage 24 to which controller C is adapted to be connected.

In accordance with the present invention, a communication system is interconnected with controller C so as to provide access to controller C from a location remote from the location at which storage system 20 is installed. In a manner to be explained, the communication system is operable to monitor, diagnose and/or control storage system 20 from a remote location, so as to facilitate servicing, repair and maintenance of storage system 20.

Figure 4:
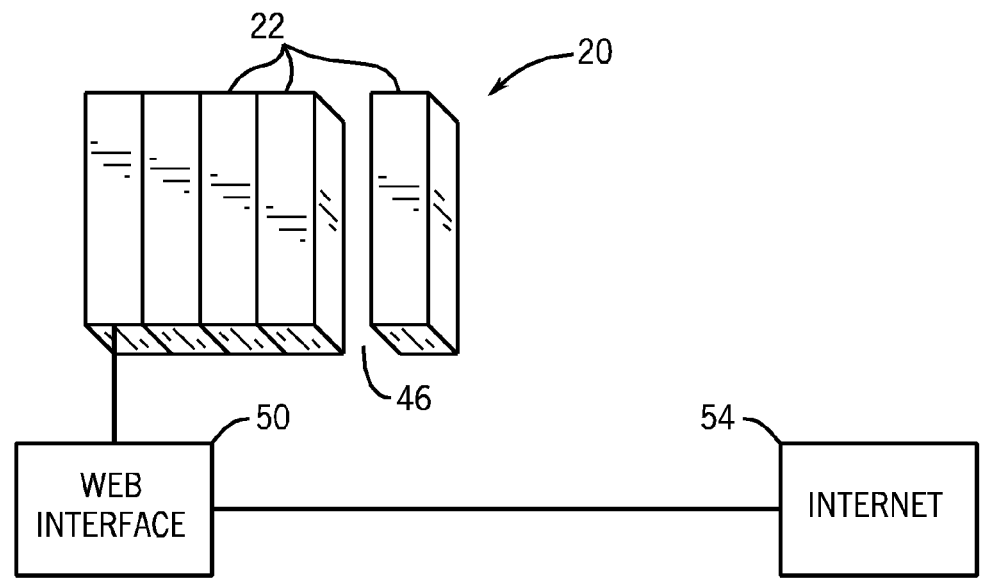
FIGS. 4-6 are schematic representations of various installations that can be accomplished using the mobile storage system, such as shown in FIG. 1, incorporating the communication system of the present invention.
Figure 5:
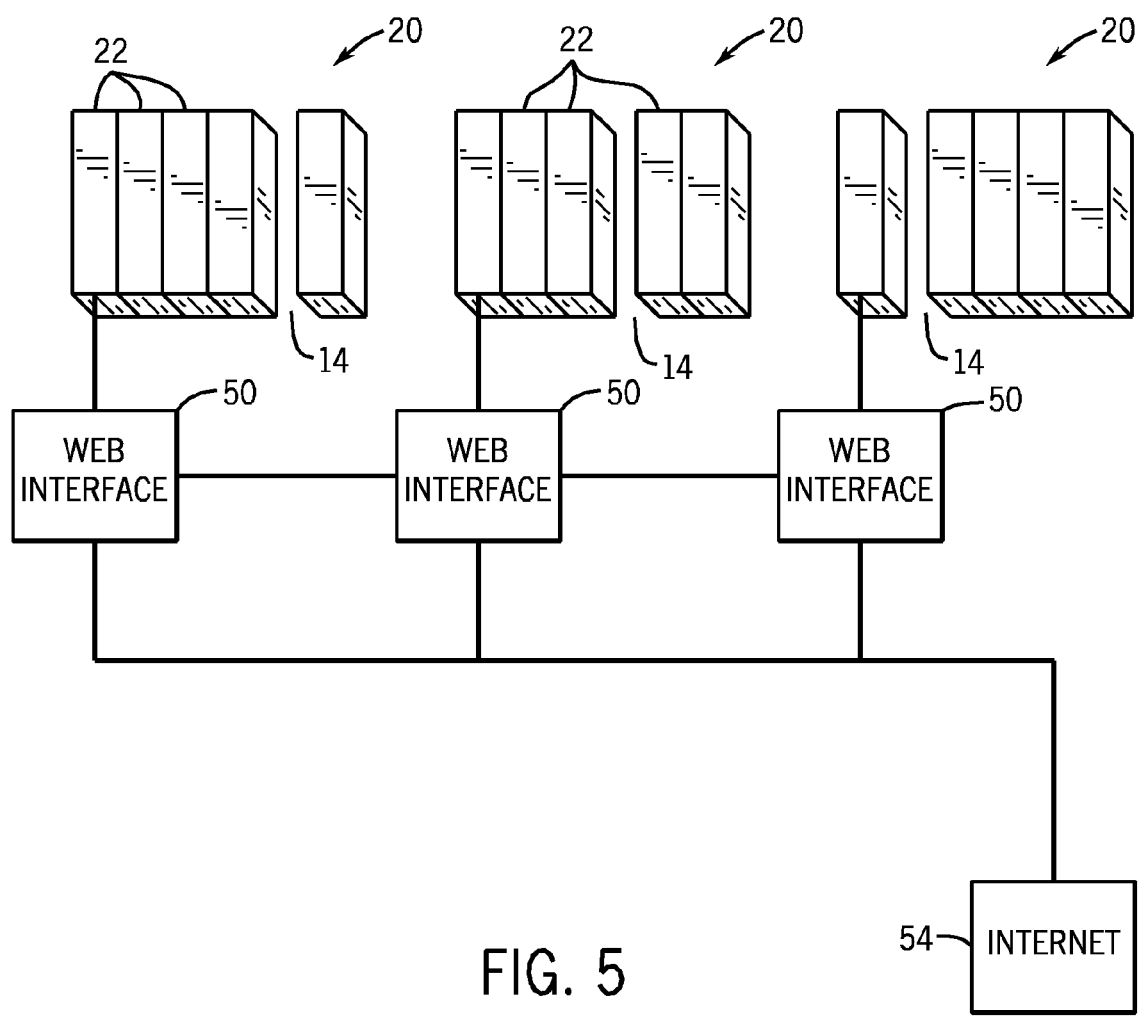
Figure 6:
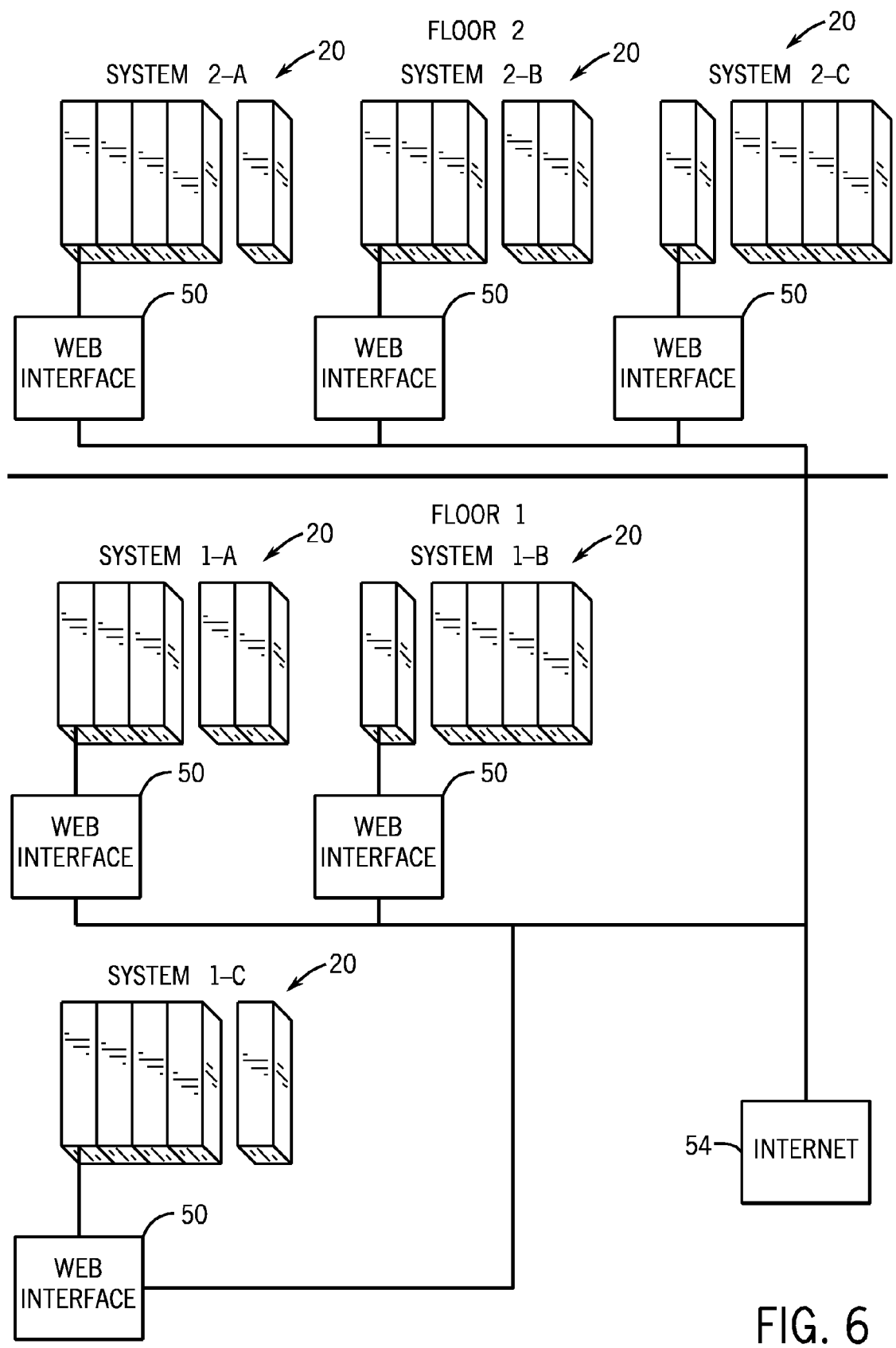
Figure 7:
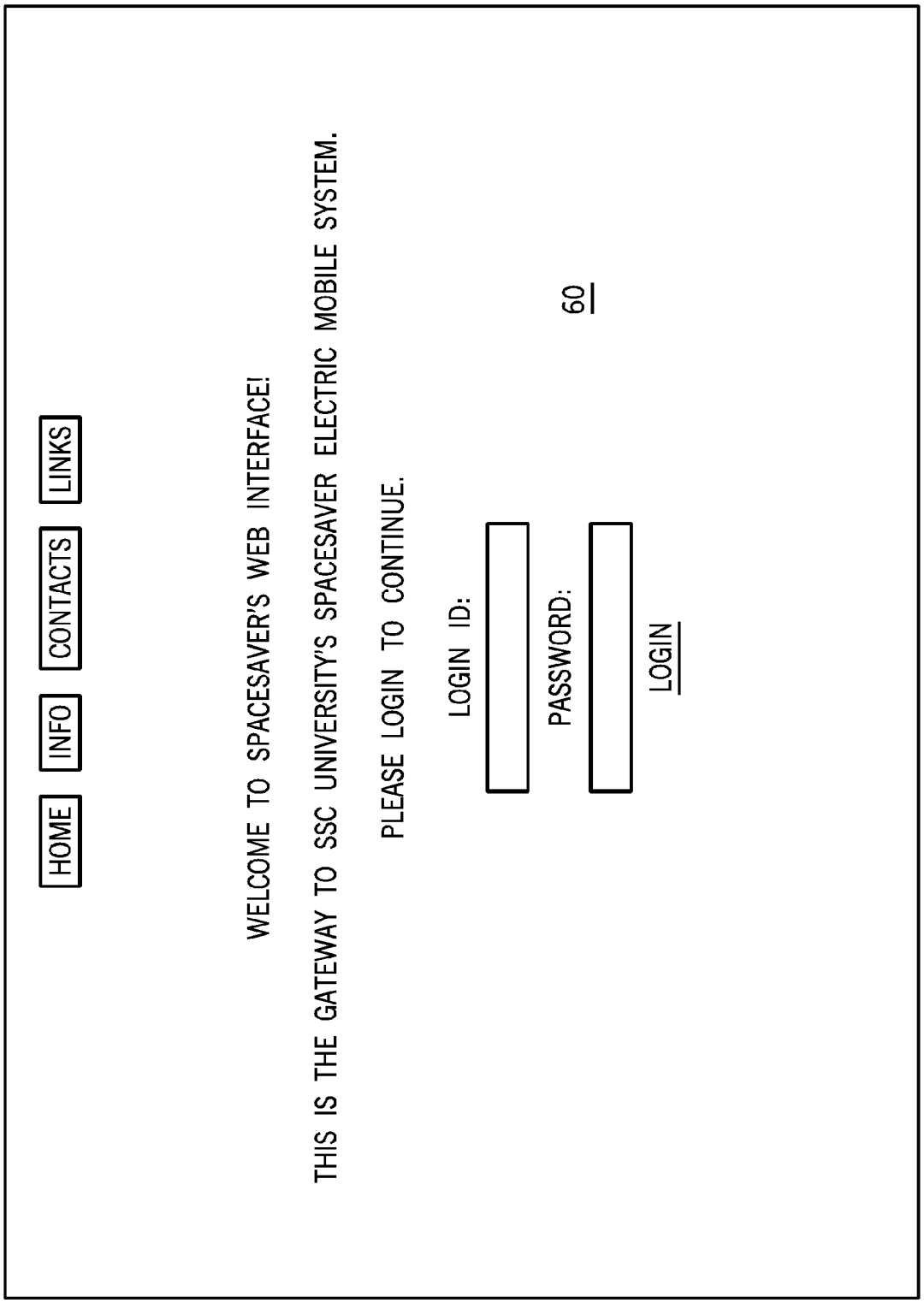
Figure 11:
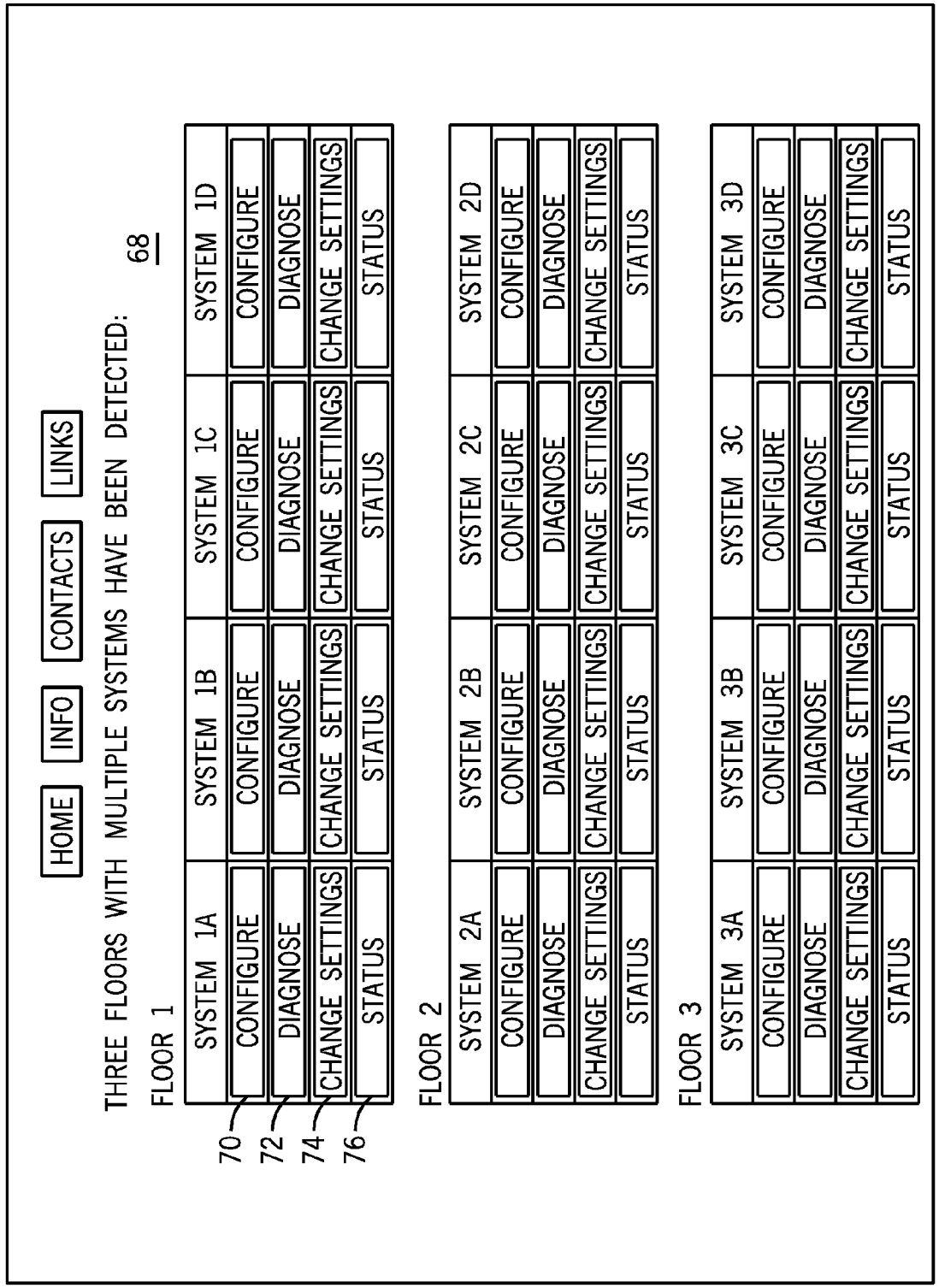

In a first embodiment of the invention as shown in FIGS. 3 and 4, a communication interface in the form of a web server or interface 50 is connected to the controller C of each storage module 22. Web interface 50 may be incorporated in the same housing as controller C for mounting to carriage 24, or may be contained in a housing separate from controller C. In addition, the overall installation may include a web gateway for controlling access to the web interfaces or, as in the illustrated embodiment, each web interface 50 may be configured to provide a gateway function. Each web interface 50 is interconnected in a conventional manner with a global computer network, commonly known as the Internet, represented at 54.

In operation, using the Internet 54, a user is able to gain access to each web interface 50, to allow the user to interface with the controller C of each storage module 22 from any location having Internet access. This allows the user to monitor, diagnose, change settings and otherwise control and interact with storage unit 22 from any location, no matter how remote relative to the location of the installation of storage systems 20.

The user interface screen views of FIGS. 7 through 14b contain a representative illustration of the manner in which web interfaces 50 provide interface capability for the storage modules 22 that are interconnected with web interfaces 50.

Using the Internet 20, a user can access web interfaces 50 from any location, e.g. on-site, from a remote service location, a remote manufacturer location, a remote customer service center, etc. Once the user accesses web interface 50, the user is greeted with a home or welcome screen 60 (FIG. 7), where the user is prompted to enter a login ID and password, which enable the user to pass through the gateway of web i9nterface 50. When the login ID and password have been successfully entered, the user has options designated HOME, INFO, CONTACTS, LINKS and LOGIN. The HOME screen is the welcome screen 60. Screen 60 provides a single point of entry from the outside and regulates users of the web interface 50. The ID and password combination dictates whether a person has access, but also can be used to restrict access to authorized areas of the interface.

The INFO screen 62 (FIG. 8) provides basic information about the installation, including diagnostic information, customer (owner) contact information as well as information pertaining to the manufacturer of storage unit 22 and an area contractor (AC), which is a local entity typically capable of providing service and other functions for the installation.

The CONTACTS screen 64 (FIG. 9) provides information as to a contact person for the installation. This is typically information pertaining to contacts at the manufacturer or at the area contractor, for persons to be contacted about the installed storage module 22.

The LINKS screen 66 (FIG. 10) provides web page links that may be of interest to the user, which are typically associated with the manufacturer of the system.

Once the user has successfully entered the login ID and password, the user logs into the system to gain access to a system overview screen 68 (FIG. 11), which provides a representation of the layout of the system and the storage modules 22 incorporated in the system. The representative overview screen 68 shows a system in which four storage modules 22 are located on each of three floors of the installation.

For each storage module 22, the associated web interface 50 provides options designated CONFIGURE shown at 70, DIAGNOSE shown at 72, CHANGE SETTINGS shown at 74 and STATUS shown at 76. The user's ID and password are utilized to determine which of the options the user is allowed to access.

Selection of CONFIGURE option 70 provides access to a system configuration screen 78 (FIG. 12), which enables a user to change parameters of operation of the system so as to dictate the manner of its operation. Typically, CONFIGURE screen 78 is used by installation personnel to modify the operating parameters of the individual carriages 24 in storage module 22. Configuration screen 78 provides boxes for entering numerical values for certain parameters of operation, shown at screen section 80, as well as various toggle options shown at screen section 82.

Selection of DIAGNOSE option 72 at system overview screen 78 provides access to a system diagnostics screen 84 (FIG. 13), which provides information as to the present state of various operating parameters of storage module 22, to provide real time status of an individual carriage 24 incorporated in module 22. Based on information in system diagnostics screen 84, the user can ascertain information as to the current condition of various operating parameters, to determine whether any of the monitored parameters of operation of the carriages in storage module 22 are causing a problem. Section 86 provides information as to whether the storage module control unit is provided with any option inputs, and whether the control module is receiving any motion requests from the operator. Section 86 also provides information as to the status of limit switches, which control the range of movement of the carriages 24 of storage module 22, and whether the safety sweep or other aisle monitoring system associated with the carriages 24 of storage module 22 is operating within normal parameters. In section 88 of diagnostic screen 84, information is provided as to error flags associated with storage module 22, including an "okay to move" (OKTM) signal drop characteristic, a "move too long" characteristic, a "creep too long" characteristic, a "motor speed differential" characteristic, a "no motor counts" characteristic and a "lost system communication" characteristic. All of these flags are responsive to a monitoring system that ascertains whether such characteristics are within or without normal operating parameters, providing a real time picture as to the operating characteristics of the carriages 24 incorporated into storage module 22. Section 88 also provides information as to a redundant safety apparatus, such as is available from Spacesaver Corporation of Fort Atkinson, Wis. under the designation "ZERO FORCE SENSOR" (ZFS), providing an indication as to the status of the various components incorporated into the redundant safety system.

When system diagnostics screen 84 is viewed by off-site service personnel, and one or more characteristics indicated by system diagnostics screen 84 indicate an error or malfunction in a component of storage module 22, the service personnel is able to ensure to have the correct replacement parts onboard at the time the service personnel makes a service call to repair storage module 22. This results in more efficient delivery of service, and eliminates down time that can be experienced if the service personnel does not have the correct parts onboard at the time of making the service call. Many of the parameters and characteristics, which are monitored and indicated in system diagnostics screen 84, are reported in diagnostics screen 84 according to the parameters that are set using system configuration screen 78. At start-up, the installation is typically made by setting the parameters on configuration screen 78 and then utilizing diagnostic screen 84 to ensure that the storage module 22 operates in a manner desired by the user, which enables the user to change the system configuration settings on screen 78 until desired operating performance is attained.

Diagnostic screen 84 can also be used by manufacturer service representatives if a local service provider is on site and has difficulty ascertaining the nature of a problem. The manufacturer service personnel can then log into the system to provide remote assistance to the local service personnel at the same time the local service personnel is working on the system, either on-site or at a remote location.

Diagnostic screen 84 can be used as the carriage 24 of storage module 22 is being operated, which results in real time changes in the readings on screen 84 to enable service personnel to ascertain the nature of a problem.

Selection of CHANGE SETTINGS option 74 on system overview screen 68 provides access to an interface settings screen 90 (FIGS. 14a and 14b), which contains the settings for web interface 50 of storage module 22. Such settings include customer information, information as to a local representative or area contractor, modem settings in the event web interface 50 is provided with a modem, ethernet settings if the customer has a local area network in order to enable storage module 22 to become a member of the network, and contact settings which are used if the system requires attention. The contact settings enable the system to direct a call for help if certain conditions are present. The contact settings provide the name and contact information for certain people responsible for the system at various times of day and days of the week, and different persons or contact information can be provided for different conditions which can be selected. The illustrated screens show representative examples of conditions that can be selected from a certain predetermined group of conditions, and the maximum allowable length of time for each condition can be selected. When the selected condition and time endurance are met, the system automatically establishes contact with the predetermined contact person according to the contact information as input, to provide the contact person with an indication as to the possible existence of an error in operation of the system, or at least that the selected condition has endured for a time period exceeding the selected time period. It is understood that any number of other conditions may be used, according to user requirements or manufacturer input. It is also understood that the system may also be configured to copy the manufacturer (either blind copy or regular copy) on any condition report that is communicated out from the system. This enables the manufacturer to monitor the local service personnel, to ensure the customer is being serviced and that the local service personnel are addressing the problem.

Selecting the system STATUS option 76 at system overview screen 68 provides access to a basic system status screen (not shown), which provides various types of high level information including installation date, usage count, current status and number of times the system has been accessed remotely. The status screen is more suited to a less technically inclined person, and provides a basic view of historical usage of an aisle or carriage.

Another mode of communication is possible in the event the customer does not have a LAN or other access to the Internet. In this mode, each web interface module 50 is interconnected with a phone line. From a remote location, the interface module 50 is accessed by telephone, and the connection is immediately cut off. This triggers interface module 50 to dial up an ISP to gain access to the internet 54, and the remote operator then can connect through the ISP to the interface module 50 to operate it as described.

Alternatively, the user can dial directly into the interface module 50 to establish direct connection to the interface module, although this prevents access by other users.

The web interface system of the present invention can be incorporated as original equipment in each storage module 22, or can be retrofitted onto existing storage modules 22 by adding a web interface board to the control module board. Such connections can be made either via wired or wireless connection system.

Additional features and characteristics of the system of the present invention are as follows.

The communication interface of the present invention connects an electrically operated mobile storage system to any desired entity, such as the manufacturer, customer service personnel, or local service personnel, via a web interface and e-mail. A web interface "box" is connected to the electric control system as well as the internet (either permanently or on-demand). The Internet connection is accomplished by utilizing a customer's existing phone line (dial-up internet access) or LAN (Local Area Network) connection. The communication interface also allows a direct connection through a serial port for non-network on-site access. Multiple user connections are supported to provide for conference-type status retrieval or troubleshooting.

The communication interface is preferably in the form of a small embedded web server that stores its web pages within its own memory. The web pages and other on-board software can be updated dynamically via the Internet to prevent obsolescence. Furthermore, the communication interface provides expansion to accommodate increasing memory consumption as a result of more sophisticated web sites in future releases.

The communication interface boasts many features to increase customer satisfaction. It creates a direct link to the manufacturer or to any other desired entity, including the manufacturer's designated area contractor or other service personnel.

Information about any system connected to the communication interface is readily available in many formats. The local contractor or manufacturer service and installation personnel have only to send an e-mail to the desired communication interface requesting information, and an e-mail is returned with the specific details requested. Alternatively, for higher-use systems, status e-mails can be scheduled to be sent to the interested parties. The manufacturer may be carbon-copied on all information requests to log service activity for parametric analysis. Information can also be viewed by logging into the communication interface and navigating the status screens to satisfy informational needs.

The communication interface is secured through the use of a login screen. Unlimited login identities and passwords are available within any number of privilege levels (e.g. four). The highest privilege is reserved for manufacturer personnel, while the remaining are used for the local service personnel and the customer. This allows the customer to dynamically restrict some users while authorizing other users to access the communication interface. All logins (successful and failed) are logged to determine hacking attempts and usage levels. Login names may be any character combination (including numbers and some special characters), e.g. from three to twenty characters in length. Passwords may be eight to twenty characters long and contain any combination of letters and numbers as well as certain special characters. These requirements make hacking the communication interface nearly impossible. Furthermore, the communication interface is not susceptible to viruses.

The communication interface continuously monitors the system to which it is connected for abnormalities and preventative maintenance opportunities. All such occurrences are reported to the proper entities (as programmed into the communication interface). Abnormal system occurrences and maintenance issues are programmable as are the persons notified. A decision tree methodically defining contact information and occurrence information simplifies the process of determining who is notified and for what events.

The communication interface accommodates customers with an existing LAN as well as those without. Customers that already utilize a network simply need to add additional network lines for each system to be installed. A quick configuration of the communication interface makes it a part of the customer's network.

Customers with or without an existing network can take advantage of the phone line connection. The communication interface will allow multiple modules to connect to a single phone line by sharing a modem interface box. The modem interface box is functionally similar to the communication interface as described, but adds the added capability of a phone line connection. This allows continued system access even if the network should be experiencing problems. Customers with no existing network can utilize this capability to provide outside service to the systems. However, since the communication interface relies upon network communications to share a single phone line, a small network will have to be installed to promote this phone line sharing.

It is important to note that regardless of the type of connection—Internet via LAN, Internet via modem, or serial—no special software is necessary. A standard web browser is all that is needed to perform all functions associated with the communication interface.

The connectivity the web interface provides allows for limitless possibilities. Companies that desire to provide secure access by means of a card swipe, fingerprint, or even retinal scans may now do so. If a security product exists for a computer, it can be interfaced with the web interface. Beyond security, databases can be integrated with the web interface. Once an item is placed into a system it can be inventoried and associated with a specific location. When a parametric search is performed for an item, the database will identify exactly where it is, and open the aisle of the respective system in which the item is contained.

While the invention has been shown and described with respect to controlling, monitoring and diagnosing a mobile storage system from a remote location, it is understood that the invention may also be employed to control, monitor or diagnose any type of equipment having a controller or other operational interface that is capable of interfacing using communication protocols.

Various alternatives and embodiments are contemplated as being within the scope of the following claims particularly pointing out and distinctly claiming the subject matter regarded as the invention.

We claim:

1. A mobile storage system, comprising:
   a series of movable storage units in a first location, wherein each storage unit includes
   an operating interface coupled to the movable storage unit allowing a user to manually enter information at the movable storage unit to control the movable storage unit and for providing information at the movable storage unit as to one or more operating parameters of the movable storage unit,
   a controller configured to receive the manually entered information from the operating interface and control the operation of the movable storage unit based on the manually entered information; and
   a communication system configured to interact with each operating interface, wherein the communication system is configured to provide off-site access to the operating interfaces of the movable storage units from a second location that is remote from the first location, wherein the communication system is configured to enable a remote operator in the second location to ascertain, display and change operating characteristics relating to servicing oversight of the movable storage units in the first location and wherein the remote operator is able to monitor, diagnose and control the storage system from the second location so as to facilitate troubleshooting, repair and maintenance of the storage system.

2. The mobile storage system of claim 1, wherein each controller is interconnected with the operating interface, wherein the controller is configured to control operation of one or more components of the movable storage unit and to sense one or more operating parameters of the movable storage unit, and wherein the communication system interacts with the controller for providing inputs from the second location relating to operation of the movable storage unit, and for monitoring one or more operating parameters of the movable storage unit from the second location.

3. The mobile storage system of claim 2, wherein the communication system is configured to operate via a global computer network.

4. The mobile storage system of claim 3, wherein the communication system includes a communication gateway in the first location that is interconnected in the global computer network, and a communication interface interposed between the communication gateway and each operating interface for continuously monitoring the storage system for abnormalities and preventive maintenance opportunities.

5. The mobile storage system of claim 3, wherein the communication system is configured to initiate communication in the event the operating interface senses that one or more operating parameters of at least one of the movable storage units are out of conformance with predetermined characteristics of the one or more operating parameters.

6. A method of interfacing with a mobile storage system including a series of movable storage members located in a first location remote from a second location, comprising the steps of:

controlling operation of the mobile storage system at the first location using an on-site operator controller in the first location that controls operation of the movable storage system;

providing an operating interface for each storage member of the mobile storage system, wherein the operating interface is interconnected with the on-site operator controller in the first location and allows a user to manually enter information related to one or more operating characteristics of the mobile storage system at the first location of the mobile storage system; and establishing communication with the operating interface independently of the on-site operator control from a second location remote from the first location to provide a remote operator in the second location with access to the on-site operator controller to display and change information related to the one or more operating characteristics of the mobile storage system in the first location so as to facilitate servicing, repair and maintenance of the storage system from the second location.

7. The method of claim 6, wherein the step of establishing communication with the operating interface includes sensing and/or controlling one or more operating characteristics of the mobile storage system from the second location through the operating interface.

8. The method of claim 7, wherein the step of establishing communication with the operating interface is carried out through a communication interface operably interconnected with the operating interface.

9. The method of claim 8, wherein a communication interface for continuously monitoring the storage system for abnormalities and preventive maintenance opportunities is interconnected with each operating interface, and wherein the step of establishing communication with each operating interface is carried out through the communication interface interconnected with the operating interface.

10. The method of claim 7, wherein the step of establishing communication with the operating interface is carried out using a global computer network.

11. The method of claim 10, wherein the operating interface is interconnected with a communication interface, and wherein the step of establishing communication with the operating interface is carried out through a communication gateway interposed between the communication interface and the global computer network.

* * * * *